(12) United States Patent
White

(10) Patent No.: US 9,731,600 B1
(45) Date of Patent: Aug. 15, 2017

(54) VEHICLE PICTURE FRAME

(71) Applicant: John White, Bolton, MS (US)

(72) Inventor: John White, Bolton, MS (US)

( * ) Notice: Subject to any disclaimer, the term of this patent is extended or adjusted under 35 U.S.C. 154(b) by 0 days.

(21) Appl. No.: 15/095,420

(22) Filed: Apr. 11, 2016

(51) Int. Cl.
*G06F 1/16* (2006.01)
*B60K 35/00* (2006.01)
*B60R 1/00* (2006.01)

(52) U.S. Cl.
CPC ............... *B60K 35/00* (2013.01); *B60R 1/00* (2013.01); *G06F 1/166* (2013.01); *B60K 2350/94* (2013.01); *B60R 2300/8006* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,388,881 B2 * | 5/2002 | Yamauchi | .......... | B60H 1/00985 174/71 R |
| 6,441,872 B1 * | 8/2002 | Ho | ...................... | B60R 11/0235 224/483 |
| 6,982,868 B2 * | 1/2006 | Schach | .................. | B60K 35/00 248/27.3 |
| 6,995,755 B2 * | 2/2006 | Yamaguchi | ............ | B60K 35/00 345/204 |
| 7,638,896 B2 * | 12/2009 | Ozaki | ................... | H02J 7/0068 307/154 |
| 7,724,505 B2 * | 5/2010 | Chigasaki | .............. | H04B 1/082 307/10.1 |
| 7,786,613 B2 * | 8/2010 | Hamaoka | ................ | B60R 11/02 307/9.1 |
| 7,852,622 B2 * | 12/2010 | Ferren | .................... | B60K 35/00 248/917 |
| 8,315,048 B2 * | 11/2012 | Tarnoff | ................. | G06F 1/1626 361/679.4 |
| 8,698,344 B2 * | 4/2014 | Tokue | ................. | B60R 11/0211 307/9.1 |
| 8,947,860 B2 * | 2/2015 | Snider | .................... | H04B 1/082 307/9.1 |
| 9,122,320 B1 * | 9/2015 | Rowles | ................. | G06T 1/0007 |
| 9,446,719 B2 * | 9/2016 | Lee | ...................... | B60R 11/0252 |
| 2001/0045774 A1 * | 11/2001 | Rode | .................... | B60N 2/0248 307/9.1 |
| 2002/0158512 A1 * | 10/2002 | Mizutani | ................ | B60K 37/02 307/9.1 |
| 2003/0042378 A1 * | 3/2003 | Imamura | .................. | B60N 2/44 248/274.1 |

(Continued)

*Primary Examiner* — Lisa Lea Edmonds
(74) *Attorney, Agent, or Firm* — Gulf Coast Intellectual Property Group

(57) ABSTRACT

A vehicle picture frame configured to be releasably secured within a passenger compartment of a vehicle and display digital images to the occupants thereof. The vehicle picture frame includes a housing that is rectangular in shape and has a display screen integrally formed therewith. Control buttons are located on the front of the housing and are operably coupled to a central processing unit. A support cradle is included and is designed so as to slidably receive the housing and releasably secure therein. The support cradle has a flexible mounting arm secured thereto. Distally located on the flexible mounting arm is a suction cup configured to mount the vehicle picture frame to the windshield of a vehicle. A camera is located on the housing and is configured to capture images.

16 Claims, 2 Drawing Sheets

(56) References Cited

U.S. PATENT DOCUMENTS

| | | | |
|---|---|---|---|
| 2005/0146847 A1* | 7/2005 | Hara | G06F 1/1622 |
| | | | 361/679.08 |
| 2007/0247800 A1* | 10/2007 | Smith | B60R 11/0252 |
| | | | 361/679.02 |
| 2008/0129646 A1* | 6/2008 | Bhavnani | A47G 1/14 |
| | | | 345/1.1 |
| 2011/0255227 A1* | 10/2011 | Murakami | B32B 1/00 |
| | | | 361/679.01 |
| 2011/0267759 A1* | 11/2011 | Abram | B60R 11/0235 |
| | | | 361/679.27 |
| 2013/0009460 A1* | 1/2013 | Speach | B60R 11/02 |
| | | | 307/9.1 |
| 2014/0049101 A1* | 2/2014 | Snider | H04B 1/082 |
| | | | 307/9.1 |

* cited by examiner

VEHICLE PICTURE FRAME

PRIORITY UNDER 35 U.S.C Section 119(E) & 37 C.F.R. Section 1.78

This nonprovisional application claims priority based upon the following prior United States Provisional Patent Application entitled: Picture Frame, Application No. 62/146,337 filed Apr. 12, 2015, in the name of John White, which is hereby incorporated by reference for all purposes.

FIELD OF THE INVENTION

The present invention relates generally to a graphic display device, more specifically but not by way of limitation a picture display configured to be releasably secured within a vehicle and operable to display digital pictures thereon.

BACKGROUND

Digital pictures have become increasingly popular over the years. No longer do people use film for capturing their pictures but instead utilize digital photography. Digital photography has integrated into many areas and devices that are commonly used such as but not limited to cellular phones. The convenience of digital pictures has lead to its proliferation over the last decade and has dramatically reduced the cost of ownership. Digital pictures are instantly stored once captured and can be shared instantly with friends and family helping loved ones stay more connected with each other.

Many people spend hours every day in their vehicle. Whether its commuting to work or driving for other reasons, the average adult in the Untied States spends about 2 hours in their vehicle every day. During this time many individuals may engage in phone calls, listen to music or other activities many of which are an attempt to stay connected with their loved ones and stay connected to whom is most important to them. Many people receive pictures via their cellular smart phones and will attempt to view during their drive. This has proven to be dangerous and is an undesirable method to view pictures while driving.

Accordingly, there is a need for a vehicle picture frame that is easily installed within a vehicle and is operable to display stored digital images. It is further desirable for the vehicle picture frame of the present invention to include camera in order to capture images.

SUMMARY OF THE INVENTION

It is the object of the present invention to provide a vehicle picture frame that includes a housing having a digital display screen that is operable to display digital pictures.

Another object of the present invention is to provide a vehicle picture frame operable to display digital images wherein the digital display screen in the housing is manufactured from palladium based metallic glass.

A further object of the present invention is to provide a vehicle picture frame configured to be releasably stored within a vehicle wherein the housing is slidably secured within a support cradle, the support cradle being configured to be mounted to a windshield of a vehicle.

Still another object of the present invention is to provide a vehicle picture frame that is configured to provide a display of digital images to the occupants of a vehicle wherein the support cradle includes a mounting arm, the mounting arm being secured to the rear of the support cradle.

An additional object of the present invention is to provide a vehicle picture frame operable to display digital images to the occupants of a vehicle wherein the mounting arm is flexible.

Yet a further object of the present invention is to provide a vehicle picture frame configured to provide digital photographs to occupants of a vehicle wherein the mounting arm further includes a suction cup.

Another object of the present invention is to provide a vehicle picture frame operable to display digital images that further includes a camera integral thereto that is configured to capture digital images.

Still an additional object of the present invention is to provide a vehicle picture frame operable to display digital images that includes memory device interfaces such as but not limited to USB port and a SD card slot.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
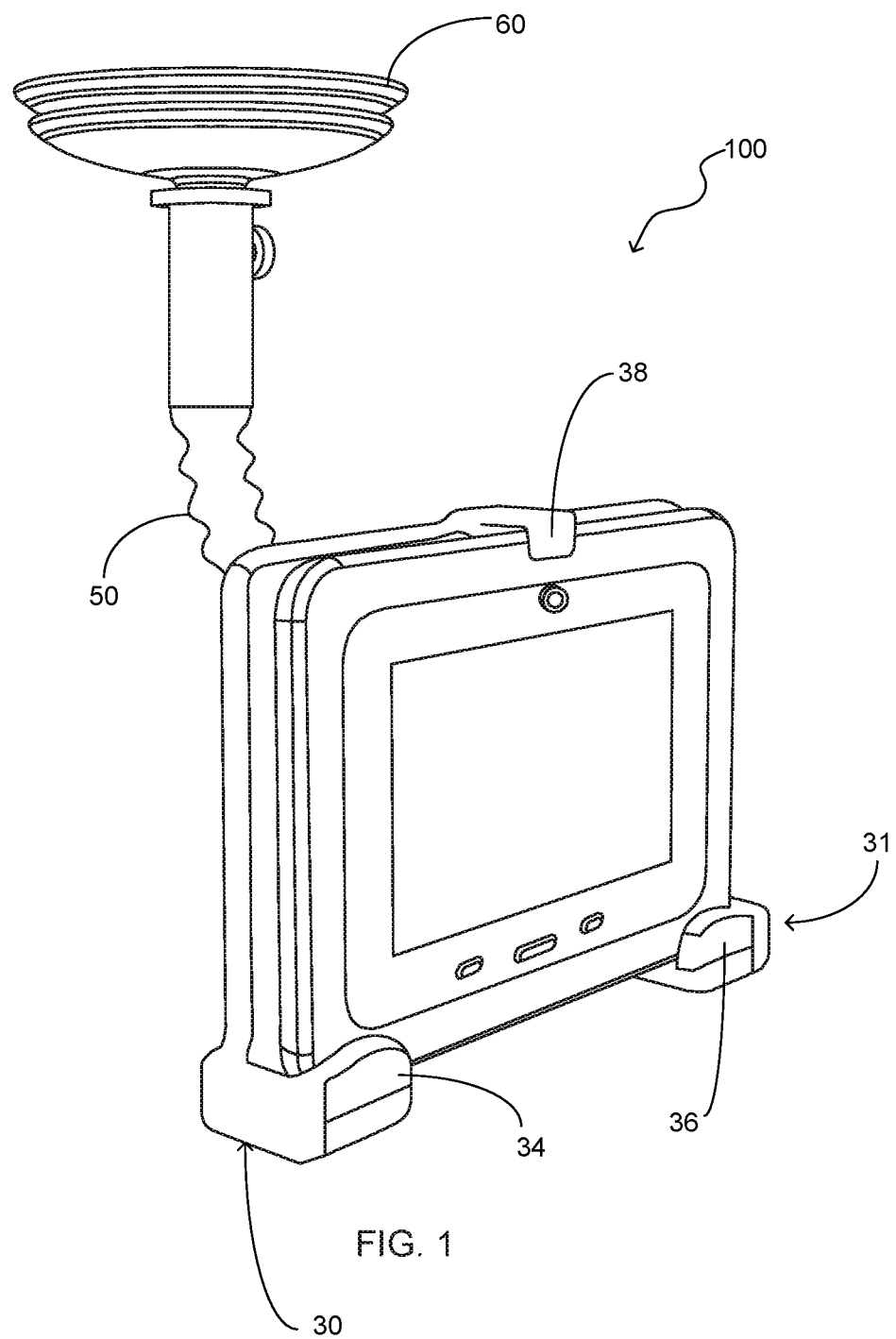
FIG. 1 is a perspective view of the preferred embodiment of the present invention mounted within the support cradle.
Figure 2:
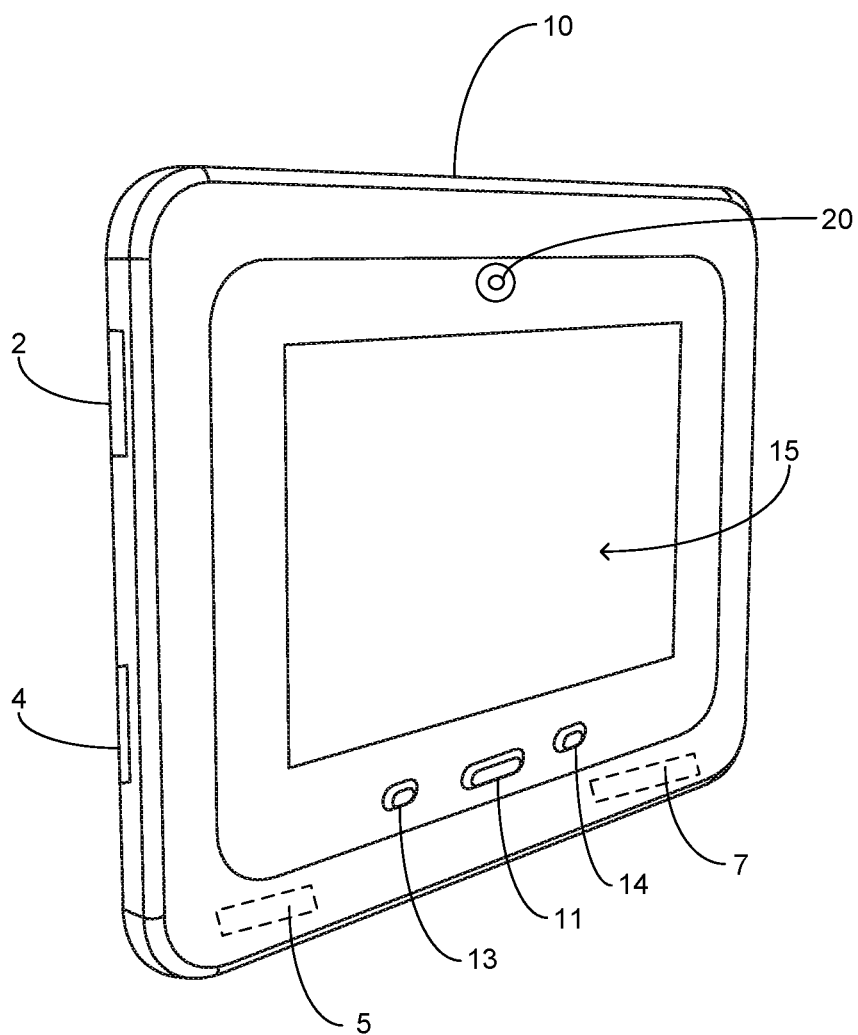
FIG. 2 is a perspective view of the present invention removed from the support cradle.

Referring now to the drawings submitted herewith, wherein various elements depicted therein are not necessarily drawn to scale and wherein through the views and figures like elements are referenced with identical reference numerals, there is illustrated a vehicle picture frame 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

The vehicle picture frame 100 includes housing 10 that is generally rectangular in shape and manufactured from a suitable durable material such as but not limited to plastic. The housing 10 has integrally mounted therein a display screen 15 that is configured to provide a display of digital images stored in the central processing unit 5 of the vehicle picture frame 100. As the present invention is intended for a vehicle, it is contemplated within the scope of the present invention that the display screen 15 be manufactured from a very durable material. While many durable materials are available, good results have been achieved utilizing a palladium based metallic glass to manufacture the display screen 15.

Secured within the interior volume of the housing 10 is central processing unit 5 and power supply 7. The central processing unit 5 includes all of the necessary electronics to store, receive, transmit and manipulate data. The central processing unit 5 is configured to provide overall functional operation of the vehicle picture frame 100 and is operably coupled to all elements thereof. The power supply 7 provides the necessary power to operate the vehicle picture frame 100. While no particular power supply is required, good results have been achieved utilizing a rechargeable lithium ion battery.

Integrally mounted to the housing 10 are the power button 11 and control buttons 13, 14. The power button 11 is operable to turn power to the vehicle picture frame 100 either on or off. The control buttons 13, 14 allow a user to manipulate through the stored digital images that are being displayed on the display screen 15. While two control buttons 13, 14 have been displayed herein, it is contemplated within the scope of the present invention that the housing 10 could have more or less than the control buttons 13, 14 illustrated and discussed herein.

A camera 20 is integrally mounted into housing 10. The cameral 20 is a conventional high definition camera lens and is operable to capture either still or motion picture digital images and transmit the captured digital images to the central processing unit 5. The camera 20 is mounted at the upper end of the housing 10 so as to be in an optimal position once the vehicle picture frame 100 has been secured within a vehicle so as to capture a digital image of all of the occupants thereof. The camera 20 provides a technique to capture digital images of the occupants of the interior of the vehicle in which the vehicle picture frame 100 has been mounted.

Integrally formed into the side of the housing 10 are a USB slot 2 and a SD card slot 4. The USB slot 2 and SD card slot 4 are operably coupled to the central processing unit 5 and function to provide a technique to allow a user of the vehicle picture frame 100 to load images to the central processing unit 100 for subsequent display. While a USB slot 2 and a SD card slot 4 have been illustrated and discussed herein as a technique for loading digital images to the vehicle picture frame 100, it is contemplated within the present invention that numerous alternate techniques could be utilized to load digital images to the vehicle picture frame 100.

As shown in particular in FIG. 1, the vehicle picture frame 100 includes support cradle 30. Support cradle 30 is manufactured from a suitable durable material such as but not limited to plastic. The support cradle 30 is designed to releasably secure the housing 10 therein. Support cradle 30 includes mounting tabs 34, 36, 38 that are position so as to allow the housing 10 to be slidably mounted within the support cradle 30. While two tabs 34, 36 have been illustrated to be on the bottom 31 of the support cradle 30 and one tab 38 on the top end 32, it is contemplated within the scope of the present invention that the support cradle 30 could be configured with alternate quantities of tabs in order to achieve the desired objective herein.

A mounting arm 50 is secured to the support cradle 30 utilizing suitable durable techniques. The mounting arm 50 is configured to be flexible in manner so as to allow a desired positioning of the housing 10 subsequent the vehicle picture frame 100 being secured within the interior of a vehicle. A suction cup 60 is secured to the mounting arm 50 distal to the cradle 30 and is configured to releasably secure the vehicle picture frame 100 to a windshield. While a suction cup 60 has been illustrated herein, it is contemplated within the scope of the present invention that alternate mounting devices could be utilized to releasably secure the vehicle picture frame 100 within the interior of a vehicle.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A digital image display device configured to be releasably secured within a vehicle comprising:
   a housing, said housing being rectangular in shape, said housing having an interior volume, said housing having a display screen, said housing being manufactured from a durable material;
   a central processing unit, said central processing unit having the necessary electronics to store, receive, transmit and manipulate data, said central processing unit being disposed within the interior volume of the housing, said central processing unit configured to control the operation of the digital image display device;
   a support cradle, said support cradle being configured to releasably receive the housing, said support cradle having at least two mounting tabs so as to slidably receive said housing;

a mounting arm, said mounting arm being secured to said support cradle, said mounting arm, said mounting arm having a first end and a second end, said first end of said mounting arm being secured to said support cradle; and wherein the digital image display device is configured to be releasably secured within the passenger compartment of a vehicle so as to display stored digital images to the occupants of the vehicle.

2. The digital image display device as recited in claim 1, and further including a camera, said camera mounted to said housing, said camera operable to capture digital images.

3. The digital image display device as recited in claim 2, and further including a mounting device, said mounting device being secured to the second end of said mounting arm, said mounting device configured to releasably secure the digital image display device within an interior of a vehicle.

4. The digital image display device as recited in claim 3, and further including at least one memory interface, said at least one memory interface formed in said housing, said at least one memory interface operably coupled to said central processing unit, said at least one memory interface configured to facilitate loading of digital images to the digital image display device.

5. The digital image display device as recited in claim 4, and further including at least one control button, said at least at control button being integrally formed with said housing, said at least one control button configured for a user to browse digital images stored on the digital image display device.

6. The digital image display device as recited in claim 5, wherein said display screen is manufactured from a palladium based metallic metal glass.

7. A vehicle picture frame configured to be releasably secured within a vehicle and display digital images to the occupants of the vehicle comprising:

a housing, said housing being rectangular in shape, said housing having an interior volume, said housing having a front side and a rear side, said housing having a display screen, said housing being manufactured from a durable material;

a central processing unit, said central processing unit having the necessary electronics to store, receive, transmit and manipulate data, said central processing unit being disposed within the interior volume of the housing, said central processing unit configured to control the operation of the vehicle picture frame;

a support cradle, said support cradle being configured to releasably receive the housing, said support cradle having a bottom, said support cradle having a top, said support cradle having at least two mounting tabs so as to slidably receive said housing;

a mounting arm, said mounting arm being secured to said support cradle, said mounting arm, said mounting arm having a first end and a second end, said first end of said mounting arm being secured to said support cradle; and a mounting device, said mounting device being secured to the second end of said mounting arm, said mounting device configured to releasably secure the vehicle picture frame within an interior of a vehicle.

8. The vehicle picture frame as recited in claim 7, and further including two control buttons, said two control buttons being integrally formed with said housing, said at least one control button configured for a user to browse digital images stored on the vehicle picture frame.

9. The vehicle picture frame as recited in claim 8, wherein said display screen is manufactured from a palladium based metallic metal glass.

10. The vehicle picture frame as recited in claim 9, and further including at least one memory interface, said at least one memory interface formed in said housing, said at least one memory interface operably coupled to said central processing unit, said at least one memory interface configured to facilitate loading of digital images to the vehicle picture frame.

11. The vehicle picture frame as recited in claim 10, and further including a camera, said camera mounted to said housing, said camera operable to capture digital images.

12. The vehicle picture frame as recited in claim 11, wherein said support cradle further include two mounting tabs proximate the bottom of the support cradle, said support cradle further including one mounting tab proximate the top of the support cradle.

13. A vehicle picture frame configured to be releasably secured within a vehicle and display digital images to the occupants of the vehicle comprising:

a housing, said housing being rectangular in shape, said housing having an interior volume, said housing having a front side and a rear side, said housing having a display screen, said housing being manufactured from a durable material;

a central processing unit, said central processing unit having the necessary electronics to store, receive, transmit and manipulate data, said central processing unit being disposed within the interior volume of the housing, said central processing unit configured to control the operation of the vehicle picture frame;

a support cradle, said support cradle being configured to releasably receive the housing, said support cradle having a bottom, said support cradle having a top, said support cradle having at least two mounting tabs so as to slidably receive said housing;

a mounting arm, said mounting arm being secured to said support cradle, said mounting arm, said mounting arm having a first end and a second end, said first end of said mounting arm being secured to said support cradle;

a camera, said camera mounted to said housing, said camera operable to capture digital images;

two control buttons, said two control buttons being integrally formed with said housing, said at least one control button configured for a user to browse digital images stored on the vehicle picture frame;

a mounting device, said mounting device being secured to the second end of said mounting arm, said mounting device configured to releasably secure the vehicle picture frame within an interior of a vehicle.

14. The vehicle picture frame as recited in claim 13, wherein said display screen is manufactured from a palladium based metallic metal glass.

15. The vehicle picture frame as recited in claim 14, and further including at least one memory interface, said at least one memory interface formed in said housing, said at least one memory interface operably coupled to said central processing unit, said at least one memory interface configured to facilitate loading of digital images to the vehicle picture frame.

16. The vehicle picture frame as recited in claim 15, wherein said support cradle further include two mounting tabs proximate the bottom of the support cradle, said support cradle further including one mounting tab proximate the top of the support cradle.

* * * * *